United States Patent
Kuo

(10) Patent No.: US 8,219,119 B2
(45) Date of Patent: Jul. 10, 2012

(54) METHOD AND APPARATUS FOR IMPROVING DRX OPERATION IN A WIRELESS COMMUNICATIONS SYSTEM

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 995 days.

(21) Appl. No.: 12/136,761

(22) Filed: Jun. 10, 2008

(65) Prior Publication Data

US 2008/0311932 A1 Dec. 18, 2008

Related U.S. Application Data

(60) Provisional application No. 60/943,561, filed on Jun. 13, 2007.

(51) Int. Cl.
*G06F 15/16* (2006.01)

(52) U.S. Cl. .................................. 455/458; 455/511

(58) Field of Classification Search ............ 455/458, 455/511, 518, 552.1, 560
See application file for complete search history.

(56) References Cited

U.S. PATENT DOCUMENTS

| | | | |
|---|---|---|---|
| 6,741,581 | B1 | 5/2004 | Sun |
| 2003/0210669 | A1 | 11/2003 | Vayanos |
| 2004/0148552 | A1 | 7/2004 | Matsumoto |
| 2005/0009527 | A1 | 1/2005 | Sharma |
| 2006/0064625 | A1 | 3/2006 | Klein |
| 2006/0293055 | A1 | 12/2006 | Pirskanen |
| 2008/0267130 | A1* | 10/2008 | Pani et al. ............. 370/331 |
| 2008/0274754 | A1* | 11/2008 | Kuo ............. 455/458 |
| 2011/0039536 | A1* | 2/2011 | Lee et al. ............. 455/422.1 |

FOREIGN PATENT DOCUMENTS

| | | |
|---|---|---|
| EP | 1 496 639 A2 | 1/2005 |
| EP | 1 496 639 A3 | 7/2007 |
| JP | 2003273844 A | 9/2003 |
| JP | 2008228310 A | 9/2008 |
| JP | 2009219111 A | 9/2009 |
| KR | 20020019334 | 3/2002 |
| KR | 1020050091581 A | 9/2005 |
| KR | 1020050109411 A | 11/2005 |
| KR | 1020060016292 A | 2/2006 |
| KR | 1020060025231 A | 3/2006 |
| KR | 1020060031862 A | 4/2006 |

(Continued)

OTHER PUBLICATIONS

3GPP, R2-072262 3GPP TSG-RAN WG2 Meeting #58, "Introduction two DRX schemes in URA_PCH and CELL_PCH", May 2007.

(Continued)

*Primary Examiner* — Sam Bhattacharya
(74) *Attorney, Agent, or Firm* — Blue Capital Law Firm, P.C.

(57) ABSTRACT

In order to avoid system malfunction, the present invention provides a method for improving Discontinuous Downlink Reception (DRX) operation for a user equipment (UE) in a wireless communications system. The method includes stopping a timer when the UE allocated with a dedicated HS-DSCH Radio Network Temporary Identifier (H-RNTI) moves from a CELL_PCH state to a CELL_FACH state due to an uplink data transmission, wherein the timer is started when the UE enters the CELL_PCH state and is utilized for determining a time length for using a first DRX cycle.

8 Claims, 4 Drawing Sheets

FOREIGN PATENT DOCUMENTS

| | | | |
|---|---|---|---|
| KR | 100648067 | B1 | 11/2006 |
| KR | 1020070024302 | A | 3/2007 |
| TW | 200402978 | A | 2/2004 |
| TW | 200410575 | A | 6/2004 |
| WO | 2006071831 | A2 | 7/2006 |
| WO | 2006071831 | A3 | 7/2006 |
| WO | 2006100597 | A1 | 9/2006 |

OTHER PUBLICATIONS

3GPP, R2-072305 3GPP TSG-RAN WG2 Meeting #58, "Introduction of HS-DSCH reception in CELL_FACH, URA_PCH and CELL_PCH", May 2007.

3GPP, R2-071884 3GPP TSG-RAN WG2 Meeting #58, "Restriction on the number of MIMO processes", May 2007.

3GPP TSG-RAN WG2 Meeting #58, Kobe, Japan, 07.-11.05 2007 (R2-072262).

3GPP TSG-RAN WG2 Meeting #58, Kobe, Japan, 07.-11.05 2007 (R2-072305).

3GPP TSH-RAN WG2 Meeting #58bis, Orlando, USA, Jun. 25-29, 2007 (R2-072364).

Office Action on corresponding foreign application (JP2008-153381) from the Japan Patent Office dated Dec. 14, 2010.

Notice of Allowance on corresponding foreign application (KR Application No. 10-2008-55830) from the Korean Intellectual Property Office dated Sep. 30, 2010.

Office Action on corresponding foreign application (JP2008-151123) from the Japan Patent Office dated Nov. 9, 2010.

Notice of Allowance on corresponding foreign application (KR Application No. 10-2008-55831) from the Korean Intellectual Property Office dated Nov. 29, 2010.

3GPP TS 25.331 V7.4.0, 3GPP, Mar. 2007, P319,320,348,405,406,591,592,638,662.

"Universal Mobile Telecommunications System (UMTS); Radio Resource Control (RRC); Protocol specification (3GPP TS 25.331 version 7.5.0 Release 7)", ETSI TS 125 331 V7.5.0 (Jun. 2006), p. 41, p. 295, p. 371, p. 476-479, p. 684, p. 1199, ISSN: 0000-0001, ETSI Standards, LIS, Sophia Antipolis Cedex, France, XP014040019.

Qualcomm Europe: "Impact of MIMO on RAN2 Specifications" 3GPP TSG-RAN WG2 meeting #56-bis, R2-070194, pp. 1-4, Jan. 15-19, 2007, XP002482050.

Qualcomm Europe: "Proposed CR to TS 25.331 [Rel-7] on introducing MIMO in RRC specification" 3GPP TSG-RAN2 Meeting #56bis, R2-070241, pp. 1-22, Jan. 15-19, 2007, XP002482051.

3GPP TS 25.331 (Mar. 2007), p. 401-404, 442-444.

Office Action on corresponding foreign application (JP2008-151123) from the Japan Patent Office dated Mar. 1, 2011.

Qualcomm Europe, Nokia, Ericsson, Philips, Alcatel-Lucent: "Introduction of DTX-DRX and HS-SCCH less in MAC", 3GPP TSG-RAN WG2 Meeting #56-bis, R2-070346, Jan. 15-19, 2007, XP050133427, Sorrento, Italy.

Office Action on corresponding TW Patent Application No. 97122182 dated Oct. 27, 2011.

* cited by examiner

METHOD AND APPARATUS FOR IMPROVING DRX OPERATION IN A WIRELESS COMMUNICATIONS SYSTEM

CROSS REFERENCE TO RELATED APPLICATIONS

This application claims the benefit of U.S. Provisional Application No. 60/943,561, filed on Jun. 13, 2007 and entitled "Method and Apparatus for Improving UE Waiting and DRX Operation in a Wireless Communication System", the contents of which are incorporated herein by reference.

BACKGROUND OF THE INVENTION

1. Field of the Invention

The present invention relates to a method and related apparatus for improving Discontinuous Downlink Reception (DRX) operation for a user equipment (UE) in a wireless communications system, and more particularly, to a method and related apparatus for stopping a timer when the UE leaves a specific radio resource control state, for improving DRX operation.

2. Description of the Prior Art

The third generation (3G) mobile telecommunications system, the Universal Mobile Telecommunications System (UMTS), has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS (Quality of Service) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate. In addition, the 3rd Generation Partnership Project (3GPP) has set forth Long Term Evolution (LTE) with addition of new functions to provide packet-switching-domain-only services.

According to the related protocol specifications, one of protocol stacks of the UMTS, access stratum (AS), can be segmented into sub-layers for different functions. The operations of the sub-layers in the AS are well known in the art, and detailed description is not given here. The Radio Resource Control (RRC) layer, a Layer 3 protocol, is the core of communications protocols related to AS and is located in radio network controllers (RNC) of the UMTS Terrestrial Radio Access Network (UTRAN) and a user equipment (UE). The RRC layer uses RRC messages to perform RRC procedures. The RRC layer defines various RRC states to describe the usage of radio resource for the UE. RRC states can be divided into idle mode and RRC connected mode according to whether the RRC connection is established. RRC connected mode are further divided into CELL_DCH state, CELL_FACH state, CELL_PCH state and URA_PCH state.

The RRC layer in the UE starts different timers respectively according to RRC procedures, RRC messages, and initiation or transition of RRC states. One of the timers, a timer T319, is started when the UE enters the CELL_PCH state or the URA_PCH state and is stopped when the UE initiates a cell update procedure or a URA update procedure. On the other hand, a Discontinuous Reception (DRX) operation is configured by the RNC and allows the UE to restrict the downlink reception times in order to reduce power consumption. When the DRX operation is enabled, the UE is only required to receive physical downlink channels by a specific cycle. In HSPA system, only one DRX scheme is configured and a related DRX cycle length coefficient is used to determine a DRX cycle accordingly.

Furthermore, 3GPP Release 7 introduces a second DRX scheme for the CELL_PCH state and the URA_PCH state that is intended to allow fast paging after state transition to the CELL_PCH state or the URA_PCH state. When the UE enters the CELL_PCH state or the URA_PCH state, a new timer T319 is started and the DRX cycle based on the first DRX cycle length coefficient, as mentioned above, is used for paging reception. When the timer T319 expires, the UE changes to use the DRX cycle based on the second DRX cycle length coefficient. For further information about the second DRX scheme, please refer to 3GPP TSG-RAN WG2 #58 R2-072262.

Note that, the timer T319 is started when the UE enters the CELL_PCH state or the URA_PCH state. So the timer T319 is only applicable for UEs in CELL_PCH and URA_PCH state and should be stopped when the UE leaves the CELL_PCH state or the URA_PCH state. Furthermore, it is possible that the UE may leave CELL_PCH or URA_PCH state without initiating the cell update procedure. For example, a UE in the CELL_PCH state with a dedicated HS-DSCH Radio Network Temporary Identifier (H-RNTI) being configured can move to the CELL_FACH state due to uplink data transmission without initiating the cell update procedure. As a result, stopping the timer T319 only when the UE initiates the cell update procedure or the URA update procedure does not cover all conditions of state transition of the CELL_PCH state or the URA_PCH state.

SUMMARY OF THE INVENTION

The present invention provides a method and related apparatus for improving DRX operation for a UE in a wireless communications system.

The present invention discloses a method of improving DRX operation for a UE in a wireless communications system. The method includes stopping a timer when the UE allocated with dedicated HS-DSCH Radio Network Temporary Identifier moves from a CELL_PCH state to a CELL_FACH state due to an uplink data transmission, wherein the timer is started when the UE enters the CELL_PCH state and is utilized for determining the time length for using a first DRX cycle.

The present invention further discloses a communications device used in a wireless communications system for improving DRX operation. The communications device includes a control circuit for realizing functions of the communications device, a central processing unit installed in the control circuit for executing a program code to operate the control circuit, and a memory coupled to the central processing unit for storing the program code. The program code includes stopping a timer when the communications device allocated with a dedicated HS-DSCH Radio Network Temporary Identifier moves from a CELL_PCH state to a CELL_FACH state due to an uplink data transmission, wherein the timer is started when the communications device enters the CELL_PCH state and is utilized for determining the time length for using a first DRX cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
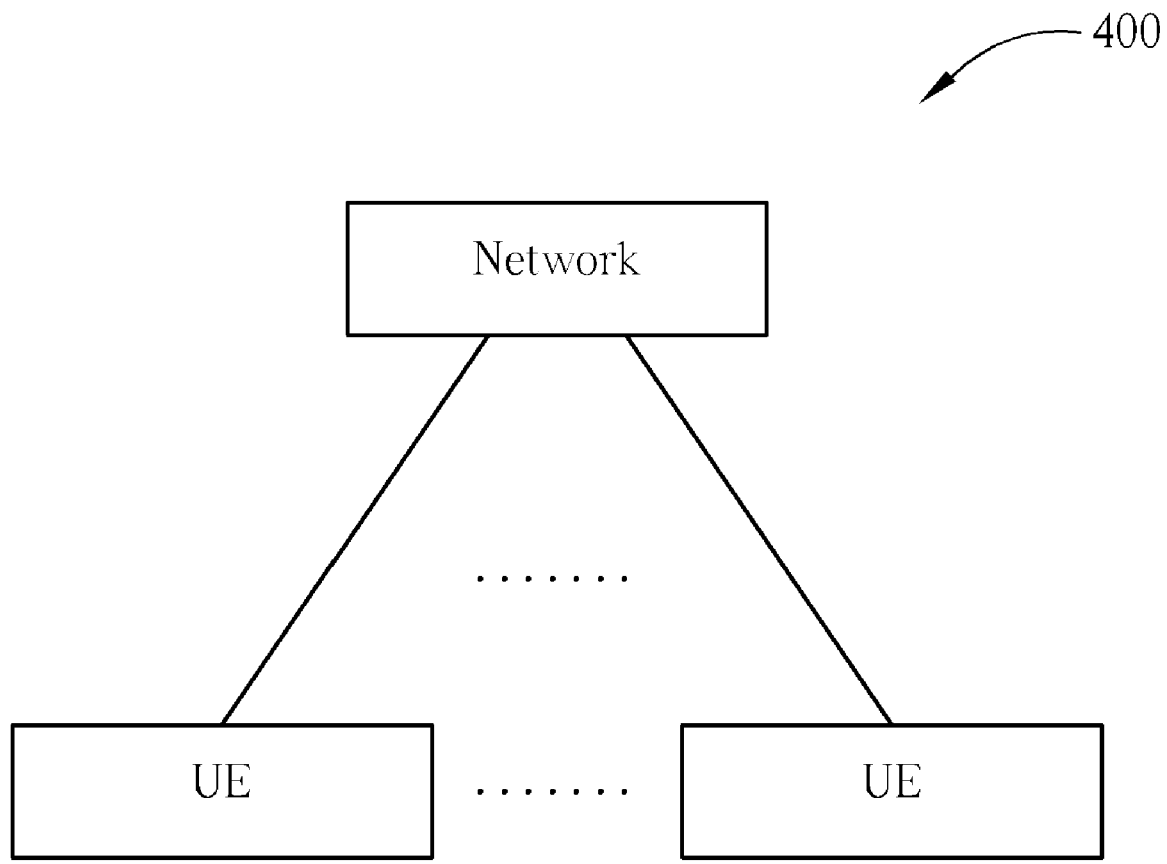
FIG. 4 is a schematic diagram of a communications system.

Please refer to FIG. 4, which is a schematic diagram of a wireless communications system 400. The wireless communications system 400 is preferably a Long Term Evolution (LTE) system, and is briefly composed of a network and a plurality of user equipments (UEs). In FIG. 4, the network and the UEs are simply utilized for illustrating the structure of the wireless communications system 400. Practically, the network may comprise a plurality of base stations (or Node B), radio network controllers and so on according to actual demands, and the UEs can be devices such as mobile phones, computer systems, etc.

Figure 1:
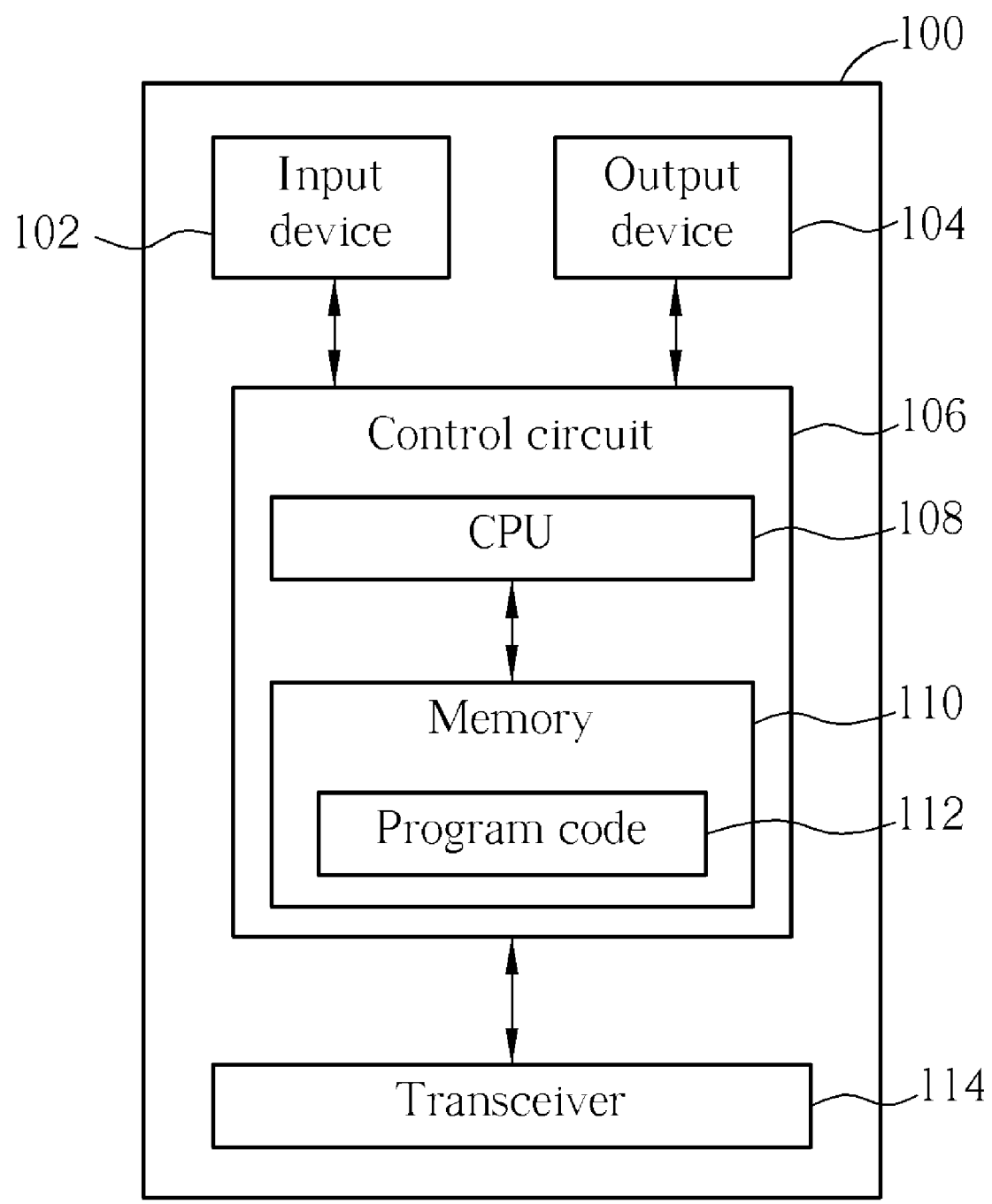
FIG. 1 is a functional block diagram of a communications device.

Please refer to FIG. 1, which is a functional block diagram of a communications device 100. The communications device 100 can be used for implementing the network or the UE shown in FIG. 4. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
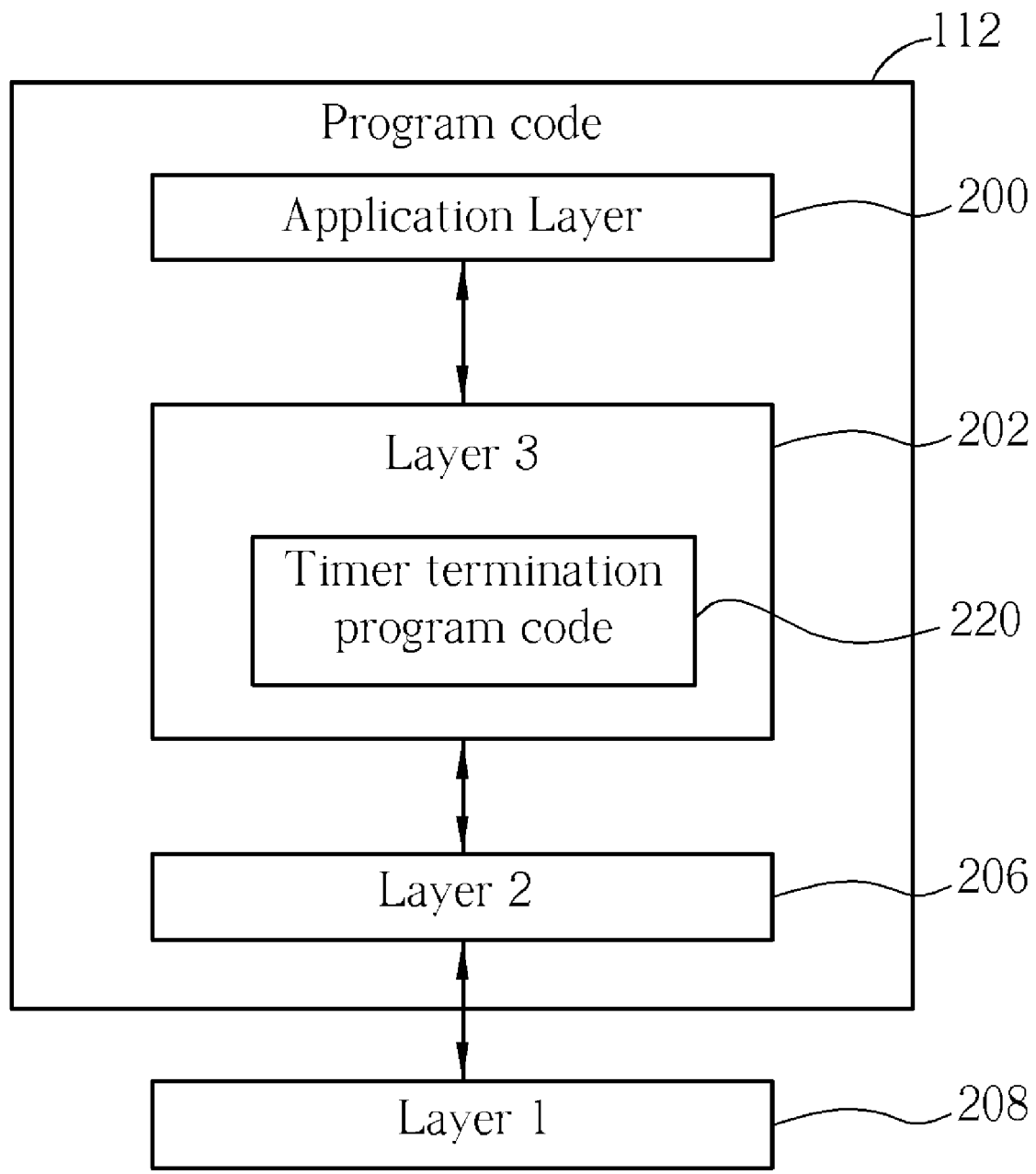
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 is for performing link control, and the Layer 1 208 is a physical layer.

Figure 3:
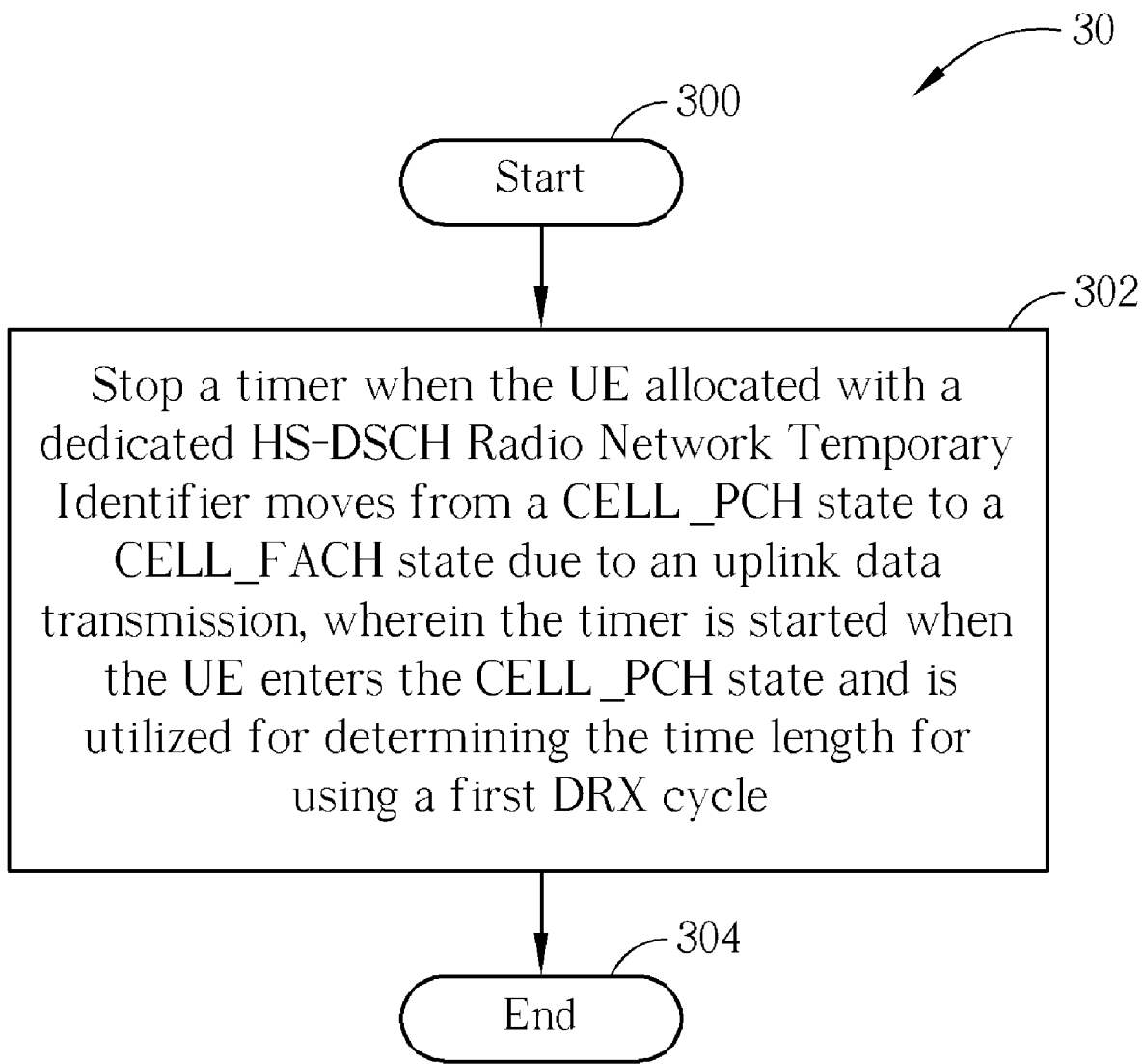
FIG. 3 is a flowchart of a process according to an embodiment of the present invention.

In the prior art, when the UE is in the CELL_PCH state with a dedicated HS-DSCH Radio Network Temporary Identifier (H-RNTI) being configured, the UE can move to the CELL_FACH state due to uplink data transmission without initiating the cell update procedure. In this situation, the timer T319 is not stopped because no cell update procedure is initiated. The embodiment of the present invention provides a timer termination program code 220 for the program code 112 in the Layer 3 202, for stopping the timer T319 when the UE leaves the CELL_PCH state for improving the DRX operation. Please refer to FIG. 3, which is a flowchart of a process 30 according to an embodiment of the present invention. The process 30 is utilized for improving the DRX operation for a UE in the wireless communications system 400. The process 30 can be compiled into the timer termination program code 220. The process 30 includes the following steps:

Step 300: Start.

Step 302: Stop a timer when the UE allocated with a dedicated HS-DSCH Radio Network Temporary Identifier moves from a CELL_PCH state to a CELL_FACH state due to an uplink data transmission, wherein the timer is started when the UE enters the CELL_PCH state and is utilized for determining the time length for using a first DRX cycle.

Step 304: End.

In the process 30, the timer is the timer T319, which is started when the UE enters the CELL_PCH state and is utilized for determining the time length for using the first DRX cycle. The first DRX cycle is generated according to a first DRX cycle length coefficient and represents a paging listening interval used by the UE for listening on the paging channel. According to the process 30, the timer T319 is stopped when the UE leaves the CELL_PCH state due to an uplink data transmission. Moreover, the embodiment of the present invention controls the UE to change to use a second DRX cycle when the timer T319 expires. The UE uses the second DRX cycle generated according to a second DRX cycle length coefficient, for listening on the paging channel. The second DRX cycle is different from the first DRX cycle.

In the prior art, the timer T319 is stopped only when the UE initiates the cell update procedure or the URA update procedure, which may result in system malfunction caused by imperfect error protection scheme. In comparison, the embodiment of the present invention stops the timer T319 when the UE in the CELL_PCH state with a dedicated H-RNTI moves to the CELL_FACH state due to uplink data transmission. Therefore, the embodiment of the present invention avoids system malfunction and further improves the DRX operation.

In conclusion, according to the embodiment of the present invention, the timer T319 is stopped when the UE leaves the CELL_PCH state. As a result, the embodiment of the present invention avoids system malfunction and further improves the DRX operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving Discontinuous Downlink Reception (DRX) operation for a user equipment (UE) in a wireless communications system, the method comprising:

being configured with two DRX cycles consisting of a first DRX cycle and a second DRX cycle;

using the first DRX cycle for paging reception and starting a timer when entering a CELL_PCH state, wherein the timer is utilized for determining the time length for using the first DRX cycle;

moving from a CELL_PCH state to a CELL_FACH state due to a uplink data transmission and stopping the timer if the UE is allocated with a dedicated HS-DSCH Radio Network Temporary Identifier (H-RNTI).

2. The method of claim 1, wherein the first DRX cycle represents a paging listening interval used by the UE.

3. The method of claim 1, wherein the UE changes to use the second DRX cycle when the timer expires.

4. The method of claim 1, wherein the UE moves from a CELL_PCH state to a CELL_FACH state due to an uplink data transmission without initiating a cell update procedure.

5. A communications device used in a wireless communications system for improving Discontinuous Downlink Reception (DRX) operation, the communications device comprising:
   a control circuit for realizing functions of the communications device;
   a central processing unit installed in the control circuit for executing a program code to operate the control circuit; and
   a memory coupled to the central processing unit storing the program code;
   wherein the program code comprises:
      being configured with two DRX cycles consisting of a first DRX cycle and a second DRX cycle;
      using the first DRX cycle for paging reception and starting a timer when entering a CELL_PCH state, wherein the timer is utilized for determining the time length for using the first DRX cycle;
      moving from a CELL_PCH state to a CELL_EACH state due to a uplink data transmission and stopping the timer if the communications device is allocated with a dedicated HS-DSCH Radio Network Temporary Identifier (H-RNTI).

6. The communications device of claim 5, wherein the first DRX cycle represents a paging listening interval used by the communications device.

7. The communications device of claim 5, wherein the communications device changes to use the second DRX cycle when the timer expires.

8. The communication device of claim 5, wherein the communication device moves from a CELL_PCH state to a CELL_EACH state due to an uplink data transmission without initiating a cell update procedure.

* * * * *